(12) United States Patent
Herzig et al.

(10) Patent No.: US 11,198,403 B2
(45) Date of Patent: Dec. 14, 2021

(54) HEAT SHIELD FASTENING MEANS

(71) Applicant: MAN Truck & Bus AG, Munich (DE)

(72) Inventors: Jürgen Herzig, Wilhermsdorf (DE);
Wolfgang Simon, Nuremberg (DE);
Alexander Lienert, Lauf (DE)

(73) Assignee: MAN Truck & Bus AG, Munich (DE)

( * ) Notice: Subject to any disclaimer, the term of this patent is extended or adjusted under 35 U.S.C. 154(b) by 67 days.

(21) Appl. No.: 16/186,031

(22) Filed: Nov. 9, 2018

(65) Prior Publication Data
US 2019/0135201 A1  May 9, 2019

(30) Foreign Application Priority Data
Nov. 9, 2017  (DE) .......................... 102017126241.5

(51) Int. Cl.
*B60R 13/08* (2006.01)
*F01N 13/10* (2010.01)
(Continued)

(52) U.S. Cl.
CPC ...... *B60R 13/0876* (2013.01); *B60R 13/0815* (2013.01); *F01N 13/102* (2013.01);
(Continued)

(58) Field of Classification Search
CPC .... F01N 13/102; F01N 13/14; F01N 13/1805; F01N 13/1811; F01N 13/1855;
(Continued)

(56) References Cited

U.S. PATENT DOCUMENTS 5,211,013 A * 5/1993 Bonde .................. F01N 13/002
181/240
6,328,513 B1 * 12/2001 Niwa ...................... F16F 1/362
16/2.1
(Continued)

FOREIGN PATENT DOCUMENTS

CA  2765978 A1  7/2012
CN  105246774 A  2/2018
(Continued)

OTHER PUBLICATIONS

German Search Report in related case DE 102017126241.5 dated Jul. 30, 2018.
(Continued)

*Primary Examiner* — Laura Freedman
(74) *Attorney, Agent, or Firm* — Maginot, Moore & Beck LLP

(57) ABSTRACT

An apparatus for shielding hot regions, in particular of an internal combustion engine, includes a heat shield with a through hole. The apparatus has a component, in particular a heat source, with a fastening region which has a receptacle and a shoulder which surrounds the receptacle at least partially. The shoulder extends through the through hole of the heat shield. The apparatus has a fastening element, in particular a screw, which fastens the heat shield to the fastening region, the fastening element being supported on the shoulder, extending through the through hole of the heat shield, and being fastened in the receptacle.

20 Claims, 2 Drawing Sheets

(51) Int. Cl.
  *F01N 13/18* (2010.01)
  *F01N 13/14* (2010.01)
  *F02B 77/11* (2006.01)

(52) U.S. Cl.
  CPC ......... *F01N 13/14* (2013.01); *F01N 13/1805* (2013.01); *F01N 13/1811* (2013.01); *F01N 13/1855* (2013.01); *F02B 77/11* (2013.01); *F01N 2260/20* (2013.01); *F01N 2450/24* (2013.01)

(58) Field of Classification Search
  CPC ............. F01N 2260/20; F01N 2450/24; B60R 13/0815; B60R 13/0876; F02B 77/11
  See application file for complete search history.

(56) References Cited

U.S. PATENT DOCUMENTS

| | | | |
|---|---|---|---|
| 7,065,963 | B2 | 6/2006 | Niwa |
| 7,273,128 | B2* | 9/2007 | Niwa ................. B60R 13/0876 |
| | | | 181/207 |
| 7,284,748 | B2* | 10/2007 | Mishima ................. F02B 77/11 |
| | | | 267/140.11 |
| 9,457,735 | B2* | 10/2016 | Migaki ................... B60R 13/02 |
| 9,499,226 | B2* | 11/2016 | Senda ................. F01N 13/1855 |
| 9,744,922 | B2* | 8/2017 | Ostermeier ......... F01N 13/1855 |
| 2012/0192495 | A1* | 8/2012 | Coughenour, Jr. ... F16B 37/044 |
| | | | 49/464 |

FOREIGN PATENT DOCUMENTS

| | | |
|---|---|---|
| DE | 102004028593 A1 | 1/2006 |
| DE | 102007048298 A1 | 4/2009 |
| DE | 102009017554 A1 | 6/2011 |
| DE | 202011001962 U1 | 1/2012 |
| DE | 112014003457 T5 | 4/2016 |
| DE | 102016106151 A1 | 10/2017 |
| DE | 102016106153 A1 | 10/2017 |
| EP | 0629785 A2 | 12/1994 |
| JP | S57112036 U | 7/1982 |

OTHER PUBLICATIONS

Chinese Office Action in related case CN 201811294471.2 dated Aug. 30, 2021. (6 pages).
English Translation of Chinese Office Action in related case CN 201811294471.2 dated Sep. 27, 2021. (3 pages).

* cited by examiner

HEAT SHIELD FASTENING MEANS

TECHNICAL FIELD

The invention relates to an apparatus for shielding hot regions, in particular of an internal combustion engine.

BACKGROUND

Heat shields can be used for shielding hot regions, for example, in the case of internal combustion engines of motor vehicles, in particular in the region of the exhaust gas section. The heat shields serve to protect temperature-sensitive components and assemblies. Here, the heat shields can also improve the sound insulation.

Heat shields are usually three-dimensionally shaped structural components which have at least one metallic sheet layer. Here, the three-dimensional shape of the at least one metallic sheet layer usually results from the shape of the components which are to be shielded with respect to one another and from their spacing from one another.

The attachment of the heat shield to the component usually takes place by means of a punctiform connection. To this end, the metallic sheet layer or all metallic sheet layers can have at least one through opening which receives a fastening element. Here, for example, screws, bolts, pins with cross bolts or rivets serve as fastening elements.

In the case of fastening to a hot component, heat can also be transmitted into the heat shield at said fastening points. The heat shield can expand on account of the action of heat and can finally contract again when no more heat is transmitted to the heat shield. Here, plastic deformations and damage of the heat shield can occur.

DE 11 2014 003 457 T5 has disclosed a heat shield. The heat shield has a through opening for the passage of a fastening element, and a sleeve which penetrates through the through opening. Furthermore, the heat shield has a decoupling element which is made from flexible material and is arranged between the circumferential edge of the through opening and the sleeve.

Further fastening systems for heat shields are known, for example, from U.S. Pat. No. 7,065,963 B2 and JP 2012 36828 A.

SUMMARY OF THE CLAIMED INVENTION

The invention is based on the object of providing an apparatus with a heat shield, in the case of which the attachment point of the heat shield to the component is improved. In particular, the attachment is to have a simple construction, and is to prevent or at least reduce damage of the heat shield on account of a thermal expansion of the heat shield.

The object is achieved by way of an apparatus according to the independent claim. Advantageous developments are specified in the dependent claims and the description.

The apparatus serves to shield hot regions, in particular of an internal combustion engine. The apparatus has a heat shield with a through hole. The apparatus has a component, in particular a heat source, with a fastening region which has a receptacle and a shoulder which surrounds the receptacle at least partially. The shoulder extends through the through hole of the heat shield. The apparatus has a fastening element, in particular a screw (or a bolt, a pin with a cross bolt or a rivet). The fastening element fastens the heat shield to the fastening region. The fastening element is supported on the shoulder, extends through the through hole of the heat shield, and is fastened in the receptacle.

The apparatus makes sliding or slidable fastening of the heat shield to the component with a simple construction possible. The shoulder makes it possible that the heat shield is not clamped in between the fastening region and the fastening element, without additional components being required to this end. Therefore, during the expansion or contraction, the heat shield can slide on the fastening region relative to the component and the fastening element. Therefore, different thermal expansions between the component and the heat shield can be compensated for. As a result, a plastic deformation and damage of the heat shield can be prevented.

A slidable fastening can be made possible with low complexity by means of the shoulder. Costs and assembly complexity can be reduced by way of an omission of additional components for providing a slidable fastening.

In one particularly preferred exemplary embodiment, the heat shield is fastened to the fastening region by means of the fastening element and the shoulder such that it can slide in a heat expansion direction of the heat shield, in particular in a direction perpendicularly with respect to a longitudinal axis of the fastening element.

In particular, in the case of thermal expansion, the heat shield can slide or can be capable of sliding below a screw head of the fastening element which is configured as a screw.

In one development, a plastic deformation of the heat shield is at least reduced or is at least capable of being reduced in the case of expansion and contraction of the heat shield under the action of heat on the heat shield.

In one exemplary embodiment, the shoulder projects beyond an outer face of the heat shield, which outer face faces away from the component. As a result, it is made possible that a gap remains between the heat shield and the fastening element and/or an intermediate element which is arranged between the fastening element and the heat shield. On account of the said gap, the heat shield can move in a sliding manner with respect to the fastening section when the heat shield expands or contracts on account of the action of heat.

In a further exemplary embodiment, a height of the shoulder is greater than a length of the first through hole, and/or a material thickness of the heat shield is smaller than a height of the shoulder.

In one embodiment, the shoulder is of annular and/or collar-shaped configuration, and/or the shoulder is spaced apart from an inner circumferential face of the through hole. As an alternative or in addition, the fastening element is supported on an annular end face of the shoulder, which annular end face surrounds an inlet opening of the receptacle.

In a further embodiment, the shoulder extends in a manner which emanates from an, in particular annular, bearing face of the first fastening region. The heat shield bears against the bearing face of the first fastening region.

In one design variant, the fastening element is supported directly on the shoulder, a gap being formed between an outer face of the heat shield, which outer face faces away from the component, and the fastening element. The gap makes the slidable fastening of the heat shield to the fastening region possible.

In a further design variant, the fastening element is supported on the shoulder indirectly via an intermediate element, in particular a washer, a gap being formed between an outer face of the heat shield, which outer face faces away from the component, and the intermediate element.

In one development, the gap is smaller than 1 mm, in particular is between 0.1 mm and 0.8 mm, preferably is between 0.2 mm and 0.5 mm. A gap having a size of this type can already be sufficient to provide a slidable fastening, with the result that no plastic deformation of the heat shield occurs.

In one exemplary embodiment, the heat shield is in one layer or in multiple layers. In the case of single-layer heat shields, a region of the heat shield which surrounds the through opening can be angled away (set away), for example, by way of stamping, in order to prevent rattling in the case of vibrations. In the case of multiple-layer heat shields, a plurality of layers, in particular metal layers, can be connected to one another via a plurality of pressure joining points. The metal layers can be of different thickness, in order that the individual layers have different natural frequencies.

In a further exemplary embodiment, the heat shield is of plate-shaped configuration and/or is adapted to an outer contour of the component. In particular, the heat shield can surround the component at least partially.

In one embodiment, the shoulder is milled into the first fastening region. In this way, the shoulder can be produced simply in terms of manufacturing technology.

As an alternative or in addition, the first fastening region can be configured as a screw boss, the receptacle can be a screw hole, for example a blind hole with an internal thread, and/or the shoulder and the fastening region can be manufactured integrally from one piece.

In a further embodiment, the component is an exhaust gas routing element, in particular an exhaust gas pipe, an exhaust gas manifold, an exhaust gas turbocharger or an exhaust gas aftertreatment system, of an internal combustion engine.

In one design variant, the heat shield is fastened to the component at least one point which is spaced apart from the through hole, in a rigid (in particular, non-slidable) manner. In particular, the point with a rigid fastening can be arranged on a side of the heat shield, which side lies opposite the through hole. In this way, starting from the said rigid fastening, the heat shield can expand in a direction of the slidable fastening in the case of the action of heat. The rigid fastening can be configured like the rigid screw connection which is disclosed herein.

As an alternative or in addition, the heat shield is fastened to the component such that it can slide at least one point which is spaced apart from the first through hole. In particular, the heat shield is connected to the component such that it can slide at points which would lead to a plastic deformation/damage of the heat shield in the case of a rigid fastening. The slidable fastening can be configured with a shoulder like the fastening region which is disclosed herein.

The invention also relates to a motor vehicle, in particular a commercial vehicle, having an apparatus as disclosed herein.

It is also possible to use the apparatus as disclosed herein in the case of other devices for shielding hot regions.

The above-described preferred embodiments and features of the invention can be combined with one another in any desired manner. Further details and advantages of the invention will be described in the following text with reference to the appended drawings, in which:

DETAILED DESCRIPTION

Figure 1:
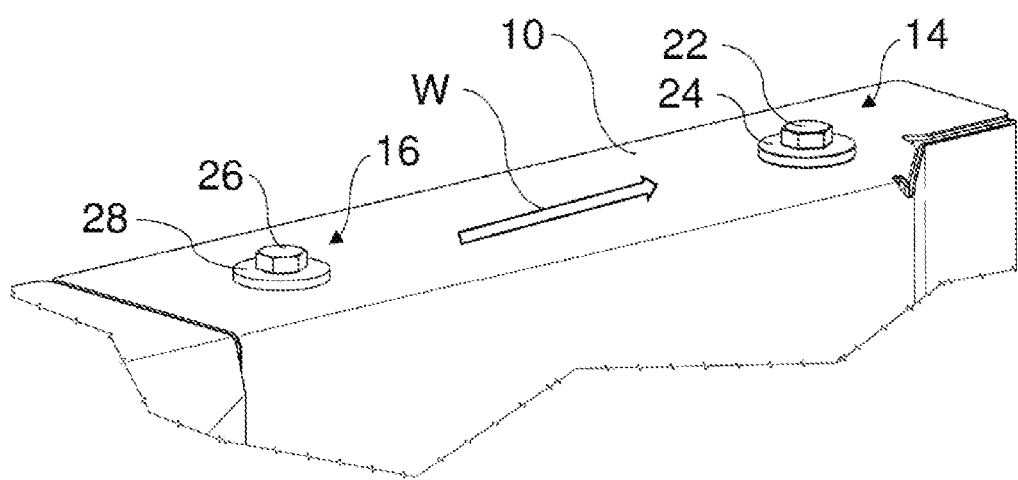
FIG. 1 shows a perspective view of a heat shield.

The embodiments which are shown in the figures correspond at least partially, with the result that similar or identical parts are provided with the same reference numerals and, in order to explain them, reference is also made to the description of the other embodiments and/or figures, in order to avoid repetitions.

Figure 2:
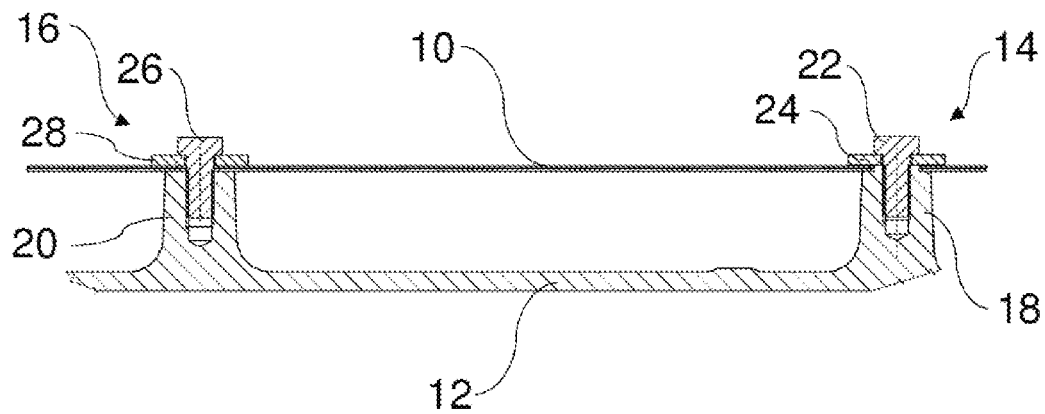
FIG. 2 shows a sectional view through the heat shield from FIG. 1.

FIGS. 1 and 2 show a heat shield 10. The heat shield 10 is attached on component 12 (see FIG. 2). The component 12 is a heat source which is to be shielded by the heat shield 10. The component 12 can be, for example, an exhaust gas routing element, for example an exhaust gas pipe, an exhaust gas manifold, a turbocharger or an exhaust gas aftertreatment system, of an internal combustion engine. The internal combustion engine can be included in a motor vehicle, in particular a commercial vehicle, for example a lorry or an omnibus.

The heat shield 10 can be configured in one layer or in multiple layers. The heat shield 10 is preferably produced from a metal.

In particular, the heat shield 10 is attached on a housing of the component 12 via a first screw connection 14 and a second screw connection 16. It is also possible, for example, that the heat shield 10 is attached on the component 12 via further screw connections and/or other fastenings.

Under the action of the heat of the component 12, the heat shield 10 can expand during operation. When the component 12 finally no longer emits heat to the heat shield 10, for example because the internal combustion engine is switched off, the heat shield 10 contracts again. Here, on account of a rigid fastening of the heat shield to the component, plastic deformations of the heat shield can customarily occur. Here, the heat shield can be damaged.

In order to prevent the plastic deformation, the heat shield 10 is fastened to a fastening region 18 of the component 12 such that it can slide via the first screw connection 14. Via the second screw connection 16, the heat shield 10 is fastened rigidly to a second fastening region 20 of the component 12.

It is also possible that the heat shield 10 is fastened to the component 12 such that it can slide via more than one screw connection, and/or that all screw connections between the heat shield 10 and the component 12 fasten the heat shield 10 to the component 12 such that it can slide.

The first screw connection 14 has a fastening element 22 and an intermediate element 24. The second screw connection 16 has a fastening element 26 and an intermediate element 28. The fastening elements 22, 26 are configured by way of example as screws. The fastening elements 22, 26 can also be configured, for example, as bolts, pins with cross bolts or rivets. The intermediate elements 24, 28 are configured by way of example as washers. It is also possible, for example, that no intermediate elements are provided.

Figure 3:
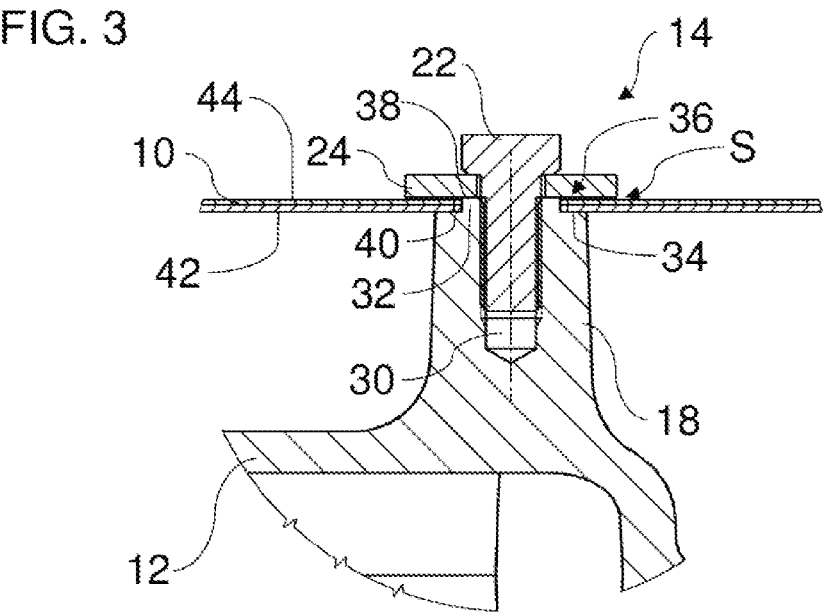
FIG. 3 shows a detailed sectional view of a first screw connection of the heat shield.

In the following text, the first screw connection 14 is described in greater detail with reference to FIG. 3.

The first fastening region 18 has a receptacle 30 and a shoulder (collar) 32. The first fastening region 18 is configured as a screw boss. The receptacle 30 is configured by way of example as a screw hole, in particular a blind hole, with an internal thread.

The shoulder 32 extends from an annular bearing face 34 of the first fastening region 18 through the first through hole 36 of the heat shield 10. The shoulder 32 extends through the first through hole 36 and projects beyond an outer face 44 of the heat shield 10, which outer face 44 faces away from the component 12. The shoulder 32 is higher than a material thickness (thickness) of the heat shield 10.

The shoulder 32 is of annular configuration and surrounds the receptacle 30. In particular, the shoulder 32 has an annular end face 38 which surrounds an inlet opening of the receptacle 30. The shoulder 32 has a circumferential face 40 which is spaced apart from an inner circumferential face of the first through hole 36. The circumferential face 40 is delimited on one side by the bearing face 34 and on the other side by the end face 38. An external diameter of the shoulder 32 is smaller than an internal diameter of the first through hole 36. The shoulder 32 is therefore spaced apart via an annular gap from the inner circumferential face of the first through hole 36.

The heat shield 10 lies on the bearing face 34 of the first fastening region 18. In particular, the heat shield 10 lies on the bearing face 34 by way of a first outer face 42 which faces the component 12.

The intermediate element 24 lies on the end face 38 of the shoulder 32. The intermediate element 24 does not lie on the second outer face 44 of the heat shield 10. In detail, there is a (small) gap S between the second outer face 44 and the intermediate element 24.

The fastening element 22 extends through the intermediate element 24 and the first through hole 36. The fastening element 22 is screwed into the receptacle 30. The fastening element 22 is supported via the intermediate element 24 on the end face 38 of the shoulder 32. The fastening element 22 clamps the intermediate element 24 in between itself and the shoulder 32. In particular, the intermediate element 24 is clamped in between a screw head of the fastening element 22 and the end face 38 of the shoulder 32.

On account of the gap S, the heat shield 10 is capable of sliding with regard to the first fastening region 18 and the fastening element 22. In other words, the heat shield 10 is not fastened rigidly to the first fastening region 18. As a result, in the case of thermal expansion, the heat shield 10 can move with regard to the first fastening region 18 within the limits of the annular gap which exists between the shoulder 32 and the inner circumferential face of the first through hole 36.

In particular, the heat shield 10 is fastened to the first fastening region 18 such that it can slide in a main thermal expansion direction of the heat shield 10, that is to say in a direction perpendicularly with respect to a longitudinal axis of the fastening element 26. Therefore, the heat shield 10 can slide under the intermediate element 28 in the case of expansion or contraction.

In order to ensure slidable fastening of the heat shield 10, the gap S can be, for example, greater than 0.1 mm and smaller than 0.8 mm. Depending on the possible manufacturing and assembly tolerance, the gap S can also be dimensioned, for example, in the range of hundredths of millimetres.

It is also possible, for example, that no intermediate element is provided, and a fastening element is supported directly on the shoulder 32. In the case of a fastening element of this type, a diameter of the screw head would be greater than a diameter of the first through opening 36 of the heat shield 10. In other words, the fastening element and the intermediate element can also be produced as an integrated unit from one piece.

Figure 4:
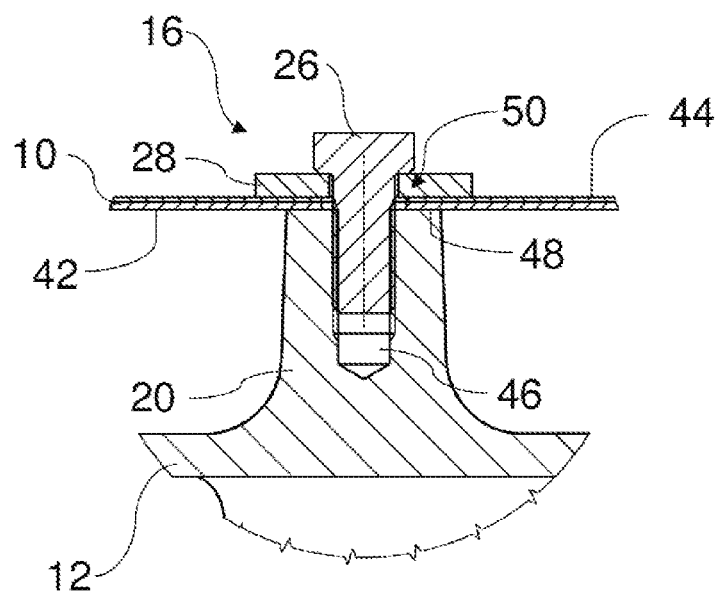
FIG. 4 shows a detailed view of a second screw connection of the heat shield.

FIG. 4 shows the rigid screw connection 16 in greater detail.

The second fastening region 20 has a receptacle 46 and an annular bearing face 48. The receptacle 46 is configured as a screw hole, for example blind hole, with an internal thread. The annular bearing face 48 surrounds an inlet opening of the receptacle 46.

That outer face 42 of the heat shield 10 which faces the component 12 lies on the bearing face 48. The intermediate element 28 lies on that outer face 44 of the heat shield 10 which faces away from the component 12. The fastening element 26, in particular a screw head of the fastening element 26, is supported via the intermediate element 28 on the outer face 44. The fastening element 26 of the second screw connection 16 extends through the intermediate element 28 and a second through hole 50 of the heat shield 10, and is screwed into the receptacle 46. The heat shield 10 is clamped in rigidly between the intermediate element 28 and the bearing face 48.

With reference to FIGS. 1 and 2, the heat shield 10 can expand in a direction W (see FIG. 1) under the action of heat on account of the slidable screw connection 14 and the rigid screw connection 16. Here, the heat shield 10 can slide along the screw connection 14. Plastic deformation/damage of the heat shield 10 is prevented. In the case of the subsequent contraction of the heat shield 10 in an opposite direction to the direction W in the case of a reduction or removal of the action of heat, the heat shield 10 can again slide along the screw connection 14. Plastic deformation/damage of the heat shield 10 can also be prevented here.

The invention is not restricted to the above-described preferred exemplary embodiments. Rather, a multiplicity of variants and modifications are possible which likewise utilize the concept of the invention and therefore fall within the scope of protection. In particular, the invention also claims protection for the subject matter and the features of the subclaims independently of the claims, to which reference is made. In particular, the features of independent claim 1 are disclosed independently of one another. In addition, the features of the subclaims are also disclosed independently of all features of independent claim 1 and, for example, independently of the features with regard to the presence and/or the configuration of the heat shield, the component and the fastening element of independent claim 1.

LIST OF REFERENCE NUMERALS

10 Heat shield
12 Component
14 First screw connection
16 Second screw connection
18 First fastening region
20 Second fastening region
22 Fastening element
24 Intermediate element
26 Fastening element
26 Intermediate element
28 Receptacle
30 Shoulder (collar)
32 Bearing face
36 First through hole
38 End face
40 Circumferential face
42 First outer face 44 Second outer face
46 Receptacle
48 Bearing face
50 Second through hole
S Gap
W Heat expansion direction

The invention claimed is:

1. An apparatus for shielding hot regions of an internal combustion engine, having:
   a heat shield with a through hole;
   a component with a fastening region which has a receptacle and a shoulder which surrounds the receptacle at least partially, the shoulder extending through the through hole of the heat shield; and
   a fastening element which fastens the heat shield to the fastening region, the fastening element being supported on the shoulder, extending through the through hole of the heat shield, and being fastened in the receptacle,
   wherein the shoulder extends in a manner which emanates from a bearing face of the fastening region, and the heat shield abuts against the bearing face of the fastening region.

2. The apparatus according to claim 1, wherein,
   the heat shield is fastened to the fastening region by means of the fastening element and the shoulder such that the heat shield can slide in a heat expansion direction (W) of the heat shield perpendicularly with respect to a longitudinal axis of the fastening element.

3. The apparatus according to claim 1, wherein
   a plastic deformation of the heat shield at least is reduced or at least is capable of being reduced in the case of expansion and contraction of the heat shield under the action of heat on the heat shield.

4. The apparatus according to claim 1, wherein,
   the shoulder projects beyond an outer face of the heat shield, which outer face faces away from the component.

5. The apparatus according to claim 1, wherein,
   a height of the shoulder is greater than a length of the through hole, and/or
   a material thickness of the heat shield is smaller than a height of the shoulder.

6. The apparatus according to claim 1, wherein,
   the shoulder is of annular and/or collar-shaped configuration, and/or
   the shoulder is spaced apart from an inner circumferential face of the through hole, and/or
   the fastening element is supported on an annular end face of the shoulder, which annular end face surrounds an inlet opening of the receptacle.

7. The apparatus according to claim 1, wherein,
   the bearing face of the fastening region is annular.

8. The apparatus according to claim 1, wherein,
   the fastening element is supported directly on the shoulder, a gap (S) being formed between an outer face of the heat shield, which outer face faces away from the component, and the fastening element.

9. The apparatus according to claim 8, wherein the gap (S) is smaller than 1 mm.

10. The apparatus according to claim 8, wherein the gap (S) is between 0.1 mm and 0.8 mm.

11. The apparatus according to claim 8, wherein the gap (S) is between 0.2 mm and 0.5 mm.

12. The apparatus according to claim 1, wherein,
    the fastening element is supported on the shoulder indirectly via an intermediate element, a gap (S) being formed between an outer face of the heat shield, which outer face faces away from the component, and the intermediate element.

13. The apparatus according to claim 12, wherein the gap (S) is smaller than 1 mm.

14. The apparatus according to claim 12, wherein the gap (S) is between 0.1 mm and 0.8 mm.

15. The apparatus according to claim 12, wherein the gap (S) is between 0.2 mm and 0.5 mm.

16. The apparatus according to claim 1, wherein,
    the heat shield is in one layer or in multiple layers, and/or
    the heat shield is of plate-shaped configuration and/or is adapted to an outer con-tour of the component.

17. The apparatus according to claim 1, wherein,
    the shoulder is milled into the fastening region, and/or
    the fastening region is configured as a screw boss, and/or
    the receptacle is a screw hole, and/or
    the shoulder and the fastening region are manufactured integrally from one piece.

18. The apparatus according to claim 1, wherein,
    the component is an exhaust gas routing element comprising an exhaust gas pipe, an exhaust gas manifold, an exhaust gas turbocharger or an exhaust gas aftertreatment system, of the internal combustion engine.

19. The apparatus according to claim 1, wherein,
    the heat shield is fastened rigidly to the component at least one point which is spaced apart from the through hole, and/or
    the heat shield is fastened to the component such that the heat shield can slide at least one point which is spaced apart from the through hole.

20. A motor vehicle having an apparatus for shielding hot regions of an internal combustion engine, having:
    a heat shield with a through hole;
    a component with a fastening region which has a receptacle and a shoulder which surrounds the receptacle at least partially, the shoulder extending through the through hole of the heat shield; and
    a fastening element which fastens the heat shield to the fastening region, the fastening element being supported on the shoulder, extending through the through hole of the heat shield, and being fastened in the receptacle,
    wherein the shoulder extends in a manner which emanates from a, bearing face of the fastening region, and the heat shield abuts against the bearing face of the fastening region.

* * * * *